UNITED STATES PATENT OFFICE.

CHARLES N. ARMSTRONG, OF MONTREAL, QUEBEC, CANADA, ASSIGNOR OF ONE-HALF HIS RIGHT TO WILLIAM GRAY WARDEN, OF PHILADELPHIA, PENNSYLVANIA.

IMPROVEMENT IN PRESERVING MEATS.

Specification forming part of Letters Patent No. 208,782, dated October 8, 1878; application filed February 5, 1878.

*To all whom it may concern:*

Be it known that I, CHARLES NEWHOUSE ARMSTRONG, of Montreal, Province of Quebec, Dominion of Canada, have invented a new and useful Process of Preparing Meat for Canning; and I do hereby declare the following to be a full, clear, and precise description thereof, and sufficient to enable those skilled in the art to which it appertains to comprehend and employ the same.

Heretofore, in the process of preparing meat for canning, it has been usual to subject the meat to salting before cooking the same, in which case the broth in which it was cooked was afterward unfit for use by reason of the saltness of the same; or it has been usual to first partially cook the meat and then treat it in a preservative mixture, and cook and seal the preserved meat and broth in cans, in which latter case the broth has been unavailable as an independent article of commerce.

I have discovered that the essence extracted from meat by the cooking process may be saved and rendered valuable by the following process of preparation of the meat—that is to say: The raw meat, having been cut into suitable pieces, is, before salting, placed in a proper tank or chamber. Heat is then applied to the meat by the introduction of dry steam to the chamber or by the use of boiling water instead. When steam is employed as the cooking agent, it is evident that the water resulting from the condensation of the steam in the chamber will mix with the essence extracted from the meat. When boiling water is employed as the cooking agent, the essence of the meat boils out into the same.

After the meat has been sufficiently cooked for the purposes of subsequent treatment for preservation, the meat is removed from the cooking tank or chamber, and the bones taken out. It is then cooled by any suitable means and placed in brine, or it may be immediately placed in brine with ice. The meat is kept in brine a sufficient time for it to acquire a proper flavor and color, or, as it is termed, to "corn" the same, which must be determined by the operator.

The meat, after having been properly salted, is removed from the brine, and is then further cooked in a broth to add further nutriment thereto, which broth I prepare by boiling the bones which have, as above described, been removed from the meat. By this means the nutriment of the meat is increased and the essence of value in the bones utilized.

The essence obtained from the meat before salting, as above mentioned, is boiled down or evaporated in pans, or by other suitable means, to such consistence as may be desired, and forms, when properly packed, a valuable article of commerce.

Having thus described my invention, what I claim as new, and desire to secure by Letters Patent of the United States, is—

The process of preparing meat for canning, which consists in nearly cooking the same previous to salting in a steam or water bath, treating the meat in brine, and recooking in broth, substantially as described.

In testimony whereof I have hereunto signed my name this 23d day of January, A. D. 1878.

CHARLES N. ARMSTRONG.

In presence of—
 W. C. STRAWBRIDGE,
 J. BONSALL TAYLOR.